June 1, 1954 R. R. WATERMAN 2,679,832
STEAM BOILER CONTROL APPARATUS
Filed May 15, 1948 7 Sheets-Sheet 1

FIG_1_

FIG_2_

FIG_4_

INVENTOR.
Russell R. Waterman
BY
ATTORNEYS

June 1, 1954  R. R. WATERMAN  2,679,832
STEAM BOILER CONTROL APPARATUS
Filed May 15, 1948  7 Sheets-Sheet 3

INVENTOR
Russell R. Waterman
BY
ATTORNEYS

June 1, 1954 R. R. WATERMAN 2,679,832
STEAM BOILER CONTROL APPARATUS
Filed May 15, 1948 7 Sheets-Sheet 4

FIG_7_

FIG_8_

INVENTOR
Russell R. Waterman
BY
ATTORNEYS

June 1, 1954  R. R. WATERMAN  2,679,832
STEAM BOILER CONTROL APPARATUS
Filed May 15, 1948   7 Sheets-Sheet 5

FIG_9_

FIG_10_

INVENTOR
Russell R. Waterman
BY
Flehr & Swain
ATTORNEYS

June 1, 1954  R. R. WATERMAN  2,679,832
STEAM BOILER CONTROL APPARATUS
Filed May 15, 1948  7 Sheets-Sheet 6

FIG_11_

FIG_12_

FIG_13_

INVENTOR
Russell R. Waterman
BY

ATTORNEYS

Patented June 1, 1954

2,679,832

UNITED STATES PATENT OFFICE 2,679,832

STEAM BOILER CONTROL APPARATUS

Russell R. Waterman, Lodi, Calif.

Application May 15, 1948, Serial No. 27,186

2 Claims. (Cl. 122—451.1)

This invention relates generally to apparatus and methods for controlling the operation of steam boilers, and more particularly to apparatus and methods for automatically controlling the supply of feed water.

It is an object of the invention to provide an apparatus and method of the above character which will effect satisfactory boiler control over wide range demand requirements, and which in particular is characterized by extreme simplicity.

Another object of the invention is to provide a boiler control apparatus and method which will provide a circulatory system for feed water under stand-by conditions when no substantial amount of steam is being consumed, while likewise affording proper feed water control over a wide range of steam demand.

Another object of the invention is to provide a steam boiler control method which is characterized by continual blow-down, both during normal operation and during stand-by periods.

Another object of the invention is to provide a novel type of automatic feed water control and method which is well adapted to installations where it is desired to supply saturated or even super-heated steam to the point of demand.

Additional objects of the invention will appear from the following description in which the preferred embodiments have been set forth in detail in conjunction with the accompanying drawing.

Referring to the drawing.

Figure 1:
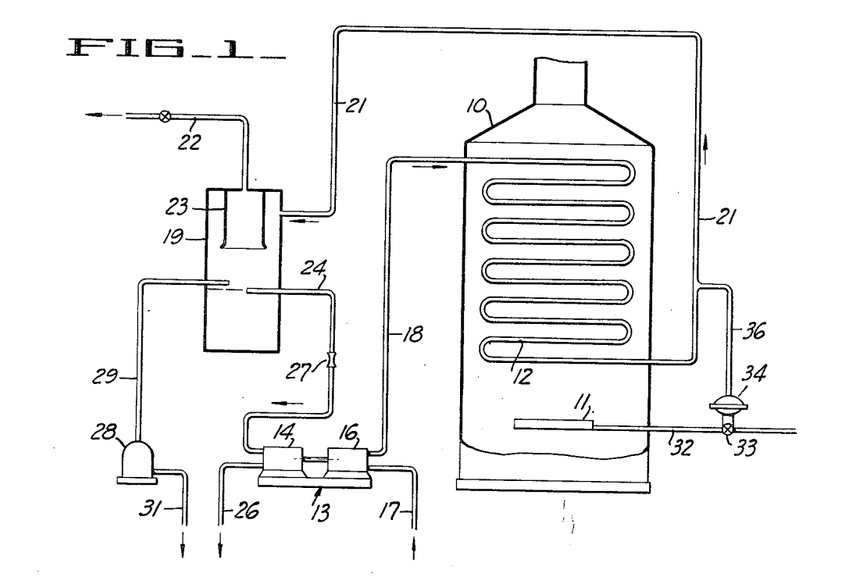
Figure 1 is a diagrammatic view illustrating a boiler installation equipped with my apparatus, and utilizing the method of the present invention.

The apparatus illustrated in Figure 1 of the drawing consists of a steam boiler unit 10 which in this instance consists simply of a suitable burner 11, together with an evaporating coil 12. As is well known to steam engineers, a boiler of this type contains a relatively small volume of water undergoing evaporation, and when employed under conditions where the steam demand varies over wide limits, it is necessary to effect corresponding changes in the supply of feed water to the coil. The feed water pumping unit 13 (diagrammatically illustrated) consists of a steam motive device 14 mechanically connected to drive the water pump 16. The motive device should be such that its rate of operation is generally proportional to the rate with which steam is supplied to the same, and the pump should be such that its pumping rate is generally proportional to the speed with which it is driven. Thus the device 14 can be of the positive volumetric displacement type, as for example a steam engine using a reciprocating piston. It should be capable of operation on steam varying over a wide range of quality, and as will be presently explained, it is also desirable that it operate upon hot water alone. The pump 16 can likewise be of the positive volumetric displacement type, as for example a pump of the reciprocating piston type or some other suitable pump in which the rate of delivery of water is proportional to the rate with which the pump is driven. Pipe 17 serves to connect the inlet of pump 16 with a source of feed water, such as a feed water tank or hot well. Pipe 18 connects the discharge side of pump 16 with the inlet end of the evaporating coil 12.

The means which I utilize for automatically controlling the feed water pump 13 includes a separating chamber 19 having its upper portion connected by pipe 21 to the discharge end of the evaporating coil 12. Pipe 22 also connects with the upper portion of the chamber 19, and leads to the point of steam consumption. It is desirable to utilize suitable baffling within the chamber 19 between the discharge end of pipe 21 and the inlet end of pipe 22. The bell 23, which has a lower open end, can serve for this purpose. A pipe 24 also connects with the chamber 19, and leads to the steam inlet side of the motive device 14. The steam exhaust line 26 from device 14 may lead to the hot well for heating the make-up feed water. Inserted in the line 24 there is a flow restricting orifice 27, which as will be presently explained, serves to control the amount of fluid supplied to the motive device 14 responsive to the quality of steam which it receives from the chamber 19.

As a means to prevent complete flooding of the interior of chamber 19, under certain operating conditions, I may provide an ordinary float controlled trap 28, having its inlet connected by a line 29 to the chamber 19 at a point above the pipe 24, and having its drain outlet connected by pipe 31 to the hot well or some other point of disposal.

Various types of known controls or safety devices can be used in conjunction with the burner 11. Thus the fuel supply line 32 to the burner is shown provided with a control valve 33, which in turn is operated by the diaphragm motive means 34. Line 36 provides a pressure connection from pipe 21 to one side of the operating diaphragm of means 34. Thus the fuel supply is regulated according to the steam boiler pressure, whereby the burner flame is reduced when the pressure rises above a normal value, and increased when the pressure drops.

Operation of the apparatus described above, and the carrying out of the present method, can be described as follows: Assume that the boiler has been placed in operation and that a normal or average steam demand is being consumed. Likewise it may be assumed that the steam is saturated, or near saturation. The upper portion of the chamber 19 forms a path for flow of steam between the lines 21 and 22. However, some water leaves the steam as it passes through the chamber, and this water tends to collect in the lower portion of the chamber. From the elevation of the lower end of the bell 23, to the lower end of chamber 19, there is a distinct gradient with respect to the quality of the steam. In other words, although the quality of steam at the lower end of the bell 23 will be about the same as delivered through pipe 22, that is near saturation for the above-specified example, at the level of communication with pipe 24 the steam is considerably wetter. For example, under the average operation previously assumed, steam supplied to pipe 24 may have a quality of about 80%. Thus such wet steam is supplied through the orifice 27 to operate the motive device 14 of the feed water pumping unit. Assume now that an increased amount of steam is withdrawn through pipe 22, such as would call for increased supply of feed water to the coil 12, in order to maintain relatively stable conditions. Such increased steam flow through the upper portion of chamber 19, by virtue of a tendency of the steam to become somewhat drier before the feed water unit has had an opportunity to compensate for the changed conditions, affects the quality of the steam in the lower portion of chamber 19, and particularly the quality of steam delivered through orifice 27 to the motive device 14. Specifically there is an increase in the quality of the steam, and thus a greater rate of flow occurs (i. e. volume per unit of time) through the orifice 27 to drive the device 14 and pump 16 at an increased rate. The increased rate of operation of the pump 16 serves to deliver a greater quantity of water to the coil 12, thus compensating for the change in operation.

Assuming now that there is a cut in the demand from the assumed average, then a lesser flow occurs through the upper portion of chamber 19, and before the apparatus has had an opportunity to automatically compensate for the changed condition, there is a tendency for the steam from pipe 21 to become somewhat wetter. These changed conditions cause a wetter steam to be withdrawn through pipe 24 for flow through orifice 27 to the motive device 14. Because of the wetter character of the steam a lesser amount (i. e. volume) flows through the orifice 27 to the pump, and therefore the pump is operated at a decreased rate to correspondingly decrease the amount of feed water supplied by pump 16.

Assuming now that there is a complete shutdown of line 22, so that there is negligible or no steam consumption, then water accumulates in the lower portion of chamber 19 because of condensation which accompanies dissipation of heat, and within a relatively short time the water level immerses the open end of pipe 24 so that water flows through pipe 24 and through orifice 27 to the steam motive device 14 of the pumping unit 13. Assuming that the motive device 14 is ported and provided with a valve capable of operation on water, then the pump 16 will be operated at a relatively slow or stand-by rate to supply water at a relatively low rate to the coil 12. Here again the orifice 27 serves to control the flow to the motive device 14, and because only water is being supplied, the rate of flow (i. e. volume per unit of time) through orifice 27 is greatly reduced. During such stand-by operations the flame of the burner is reduced to a minimum sufficient to maintain pressure.

In all of the foregoing assumed conditions the orifice 27 serves to control the flow of wet steam or water to the device 14. It is evident that this orifice automatically varies the flow of operating fluid to the device 14, responsive to variations in the ratio between water and vapor. For various demands the water to vapor ratio of the fluid passing through orifice 27 will vary over wide limits, ranging from say 85% steam to substantially 100% water. Variation in flow rate with variations of the water to vapor ratio, occurs because the density of the water-vapor mixture necessarily varies with variations in the water to vapor ratio.

For a given installation the feed water pumping unit 13 is connected to have adequate capacity for maximum demand. Orifice 27 is then selected or adjusted to be of such value that for various steam demands, the pumping unit 13 will be driven at a proper rate by the fluid passing through orifice 27, to thereby maintain the quality of steam delivered through pipe 22 relatively constant. It is presumed in this instance that one will wish to keep the quality of the steam at or near saturation.

A particular feature of the above described apparatus, and of my method, is that during stand-by conditions, when steam pressure is being maintained, the feed water pumping unit is slowly operated (by hot water supplied to motive device 14) whereby there is a continuous flow of water into and through the boiler coil. This may be termed stand-by circulation and is highly desirable in the operation of a boiler of the coil type. Specifically it tends to reduce scale formation in the coil, and assuming that motive device 14 discharges into a hot well or tank from which water is being pumped to the coil, then during the course of such circulation, scale forming compounds tend to precipitate in the hot well, rather than in the boiler coil. Thus the coil is kept relatively free of scale and at the same time hot water is continuously supplied to the coil whereby when steam consumption is resumed, the apparatus immediately resumes normal operation.

In addition to circulation under stand-by conditions, my method and apparatus employs continuous blow-down through the motive device 14 for normal boiler operation. Thus in a typical instance the steam supplied by the boiler coil to the separator chamber 19 varies in quality from say 50 to 85%, with the result that from 15 to 50% of the water supplied to the boiler coil is continuously recirculated through device 14 and the hot well, while the steam withdrawn through line 22 remains substantially dry. Such continuous recirculation or blow-down is likewise desirable in that it tends to prevent scaling and incrustation in the boiler coil, and because it tends to confine precipitation of dissolved solids in the hot well. This can be explained by pointing out that the temperature of the water-vapor mixture supplied to device 14 remains at a value near the boiler coil temperature, and the exhaust from device 14 to the hot well will be at or near 212° F. The hot well will be at a considerably lower temperature, such as 180° F., thereby affording a condition favorable for the precipitation or settlement of solids at this point of the water cycle.

In some instances it may be desirable to supply superheated steam instead of steam at or near saturation. This can be accomplished by connecting pipe 22 in series with a suitable superheat coil, which may be heated by the same burner 11.

Figure 2:
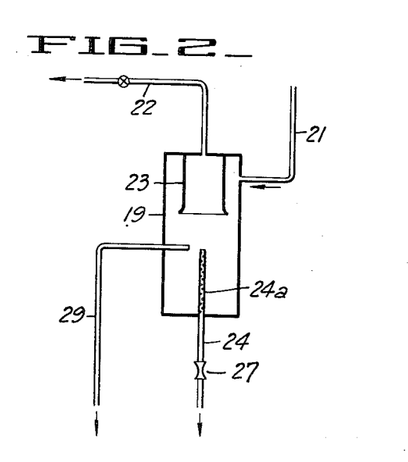
Figure 2 is a diagrammatic detail illustrating a modification of Figure 1.

Figure 2 illustrates a modification of Figure 1, in which the pipe 24 is connected to a perforated vertical pipe portion 24a within the separator chamber 19. The perforations in the pipe portion 24a are vertically spaced to extend over a zone of substantial height within the lower and middle portions of the chamber 19. With this arrangement the steam vapor and water passing through the pipe 24 and orifice 27 will likewise vary as to quality to effect automatic control as described with reference to Figure 1. As water accumulates in the lower portion of chamber 19, the lower perforations of pipe portion 24a are submerged, thus more definitely determining the density of the water-vapor mixture flowing through the orifice 27. With this arrangement the automatic control is somewhat more effective and accurate than the arrangement of Figure 1.

Figure 3:
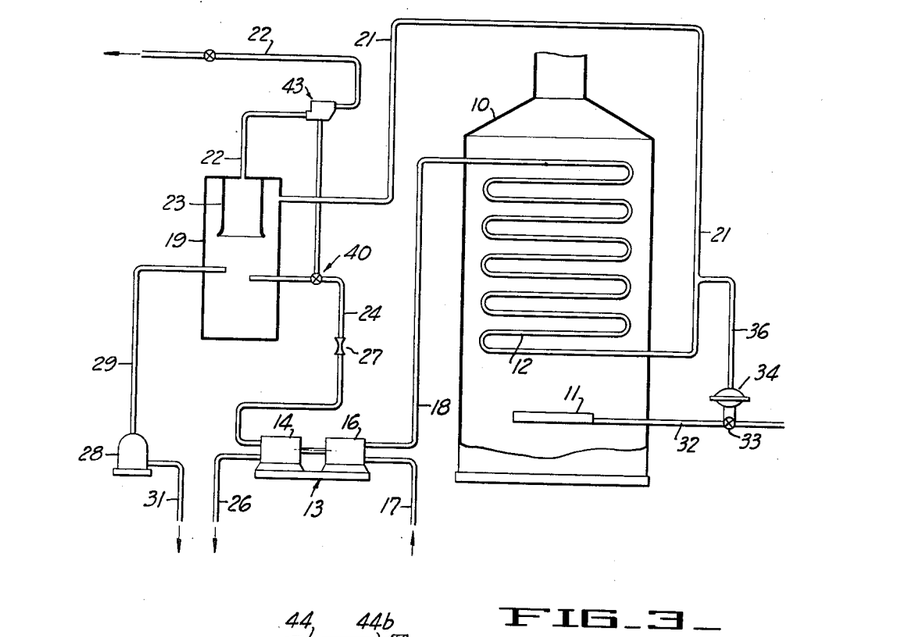
Figure 3 is a view like Figure 1, but illustrating another embodiment in which an automatically variable orifice is utilized in conjunction with the fixed orifice, as a part of the control.
Figure 3A:
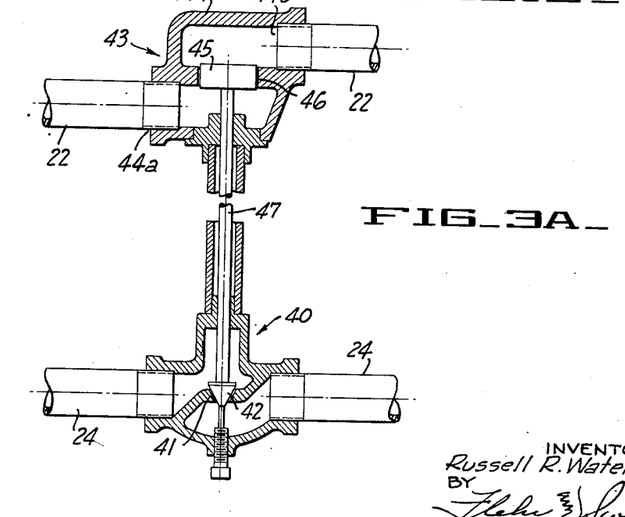
Figure 3A is a cross-sectional detail showing the construction of the flow controllers 40, 43.

Figure 3 illustrates another modification of Figure 1 in which in place of using a single fixed control orifice 27 and additional automatically controlled flow controlling device 40 is employed. This device (Figure 3A) can be in the form of a valve having an orifice 41 controlled by the movable valve member 42, which is operated by a device 43 connected in line 22. Device 43 can consist of a body 44 having inlet and outlet passages 44a, 44b, and having a movable member or disc 45, operating within the annular orifice 46. The member 45 is attached to the stem 47, which connects with the valve member 42. It will be evident that as the consumption of steam increases, the differential pressure applied to member 45 increases, thus lifting this member to correspondingly increase the effective cross-sectional flow area through the orifice 41. The arrangement of Figure 3 may be used where it is desired to automatically decrease the quality of the steam as the consumption is increased, or where in a particular instance one desires to overcome a tendency of the apparatus to undercompensate for increases in steam consumption. Also the arrangement of Figure 3 permits a decrease in the effective orifice area for stand-by conditions, thus avoiding the supply of too much water through pipe 24 to the pumping unit 13. When used only for this purpose valve 40 is constructed so that over a substantial range of steam supply the valve remains open so that control is largely by orifice 27. However, when the steam flow stops, valve 40 is positioned to provide a relatively small cross-sectional flow area, considerably smaller than orifice 27, so that it becomes the major controlling factor in regulating the amount of fluid supplied to the feed water pumping unit.

Figure 4:
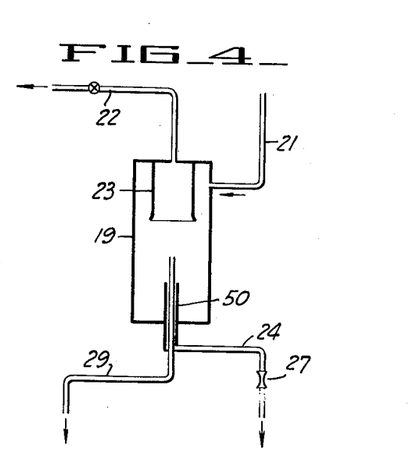
Figure 4 is a diagrammatic detail illustrating another modification of Figure 1.

Another modification of Figure 1 is shown in Figure 4. In this instance the pipe line 29 leading to the trap 28 extends vertically through the bottom of the chamber 19. That part of pipe 29 within the separator chamber is concentric with a pipe 50, which connects with pipe 24 and orifice 27.

Figure 5:
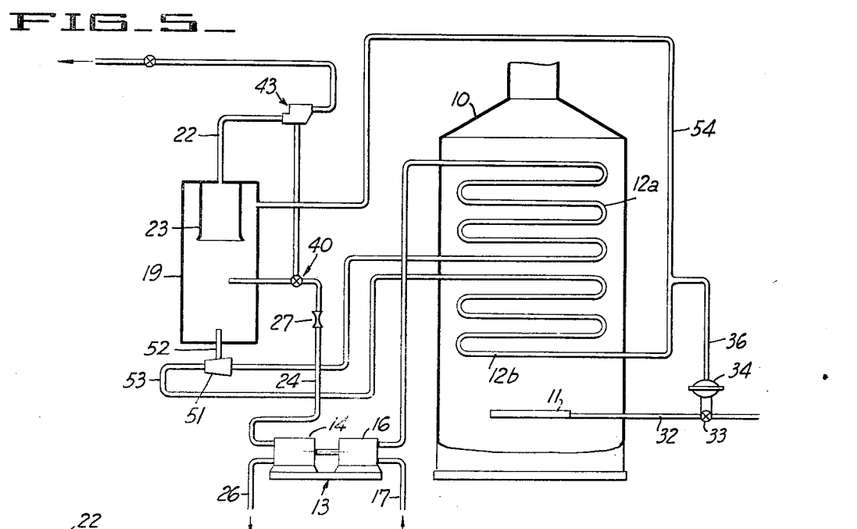
Figure 5 is a diagrammatic view illustrating an installation somewhat like Figure 3, but with an added steam ejector.

In the embodiment of Figure 5, the arrangement of Figure 3 is employed together with means for continually removing collected water or condensate from the lower end of the separator chamber 19. Thus in this instance the boiler unit is provided with two evaporating tubes 12a and 12b. Tube 12a connects to the discharge side of the feed water pump 16, and the other end of this tube connects to an ejector 51, having a water connection 52 to the lower end of chamber 19. The discharge line 53 from the ejector 51 connects to the second boiler coil 12b. The discharge end of coil 12b is connected by line 54 to the separating chamber 19.

The arrangement of Figure 5 operates in a manner similar to the modification of Figure 3, except that flow of steam through the ejector 51 serves to remove collected water from the lower end of chamber 19 and return it to the second boiler coil 12b. During periods of shut-down water accumulates in the separator 19 to submerge the inlet end of pipe 24 as previously described, thus supplying water to the motive device 14.

Figure 6:
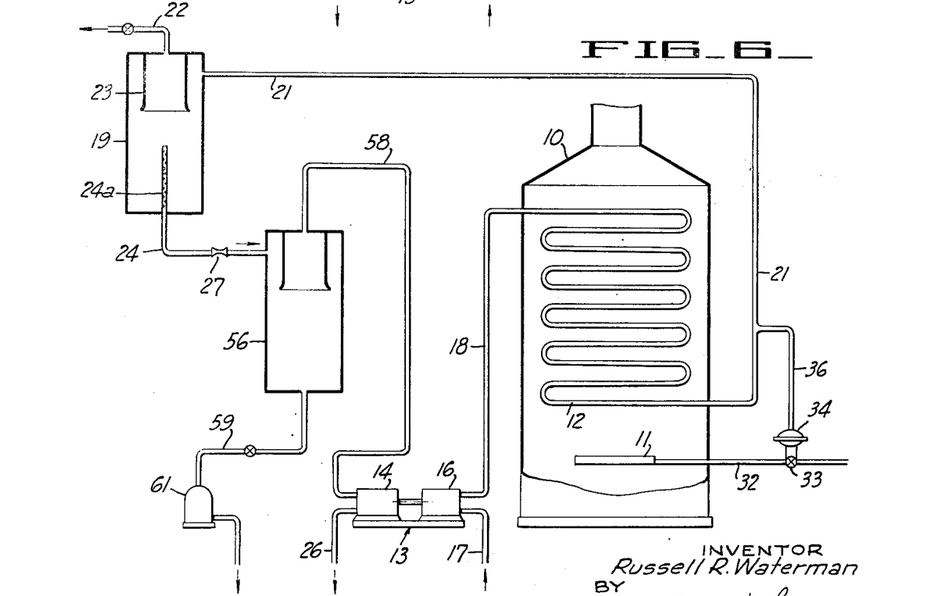
Figure 6 is a diagrammatic view illustrating an installation similar to Figure 1, but making use of two separator chambers, instead of the one chamber of Figure 1.

In the embodiment of Figure 6 an arrangement is employed which affords the same kind of control described with reference to Figure 1, but with steam at or near saturation being supplied to the feed water pumping unit. In place of utilizing the single separating chamber 19, as in Figure 1, I utilize this chamber in conjunction with the second separating chamber 56. Pipe 24 connects the chamber 19 with the upper portion of chamber 56, and pipe 58 connects the upper portion of chamber 56 with the inlet side of the motive device 14 of the feed water pumping unit. The lower portion of chamber 56 is shown connected to line 59 which leads to the trap 61, and from thence to the hot well.

With the arrangement of Figure 6 the separator 19 functions substantially in the same manner as the same separator in Figure 1. Orifice 27 delivers wet steam to the second separator 56, where the moisture is largely removed, thus providing substantially saturated steam through the line 58 for operation of the motive device 14.

Orifice 27 functions in line 24 substantially as described with reference to Figure 1. In other words the quality of steam supplied to line 24 varies in accordance with steam consumption from line 22, and the amount of fluid delivered to the separator 56 varies according to the controlling action of orifice 27. Thus the amount of steam delivered through line 58 to the motive device 14 varies accordingly. The motive device 14 in this instance can be an expansion type of engine or even a variable speed turbine, and the pump may be of the centrifugal type.

Figure 7:
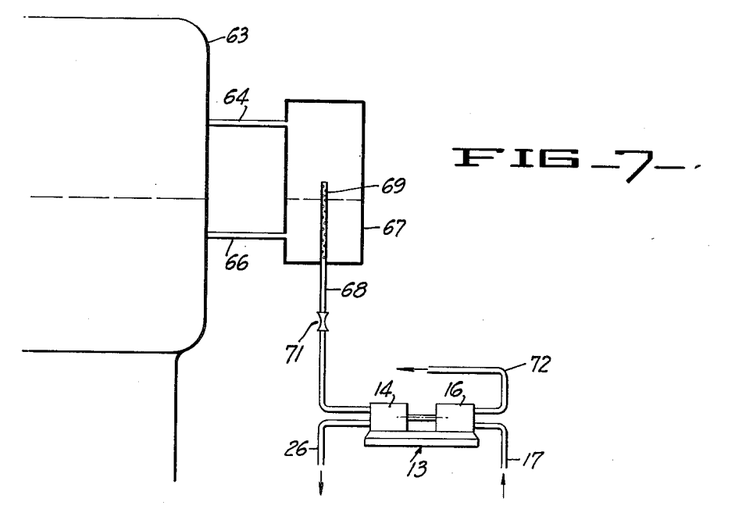
Figure 7 is a diagrammatic view illustrating application of the invention to a standard type of boiler.

Figure 7 illustrates application of the present invention to a conventional type of boiler which contains considerable water undergoing evaporation. The header chamber 63 of the boiler is provided with spaced pipes 64 and 66 which connect with the external chamber 67. Pipe 68 connects chamber 67 with the motive device 14 of the feed water pumping unit. The inner portion 69 of the pipe 68 is perforated in the same manner as the corresponding pipe 24 of Figure 2. Likewise pipe 68 is provided with a control orifice 71, corresponding to the orifice 27 of Figure 1. Line 72 connects the discharge side of pump 16 to the feed water inlet of the boiler.

When the boiler of Figure 7 is in normal operation, steam at or near saturation is being delivered, and the water level in the header 63 is at an optimum position such as indicated by dotted lines. Pipe 64 therefore forms a steam connection to chamber 67, and pipe 66 a water connection. The water level in chamber 67 tends to be substantially the same as in the tank 63. Thus when pipe portion 69 extends above the water level, some of the perforations receive steam from the upper portion of chamber 67, while the submerged perforations receive water which mixes with the steam. As a result a mixture of water and vapor flows through the orifice 71 for operation of the motive device 14. As the water level rises the ratio between water and vapor tends to increase accordingly, and a lesser amount of fluid flows through orifice 71 for operation of device 14. Thus the speed of pump 16 is automatically reduced to correspondingly reduce the supply of feed water. When the water level tends to fall the ratio between water and vapor decreases, or in other words, there is a proportionate increase in the amount of steam supplied through orifice 71. Thus pump 16 is operated at a more rapid rate. In general therefore with the arrangement of Figure 7, changes in the level of the boiler water, which tend to occur with varying steam consumption, result in compensating changes in the speed of operation of the pump 16, whereby the water level tends to be maintained substantially constant. During periods when consumption of steam is interrupted, hot water is supplied to the motive device 14 to operate the same at a relatively slow stand-by rate.

Figure 8:
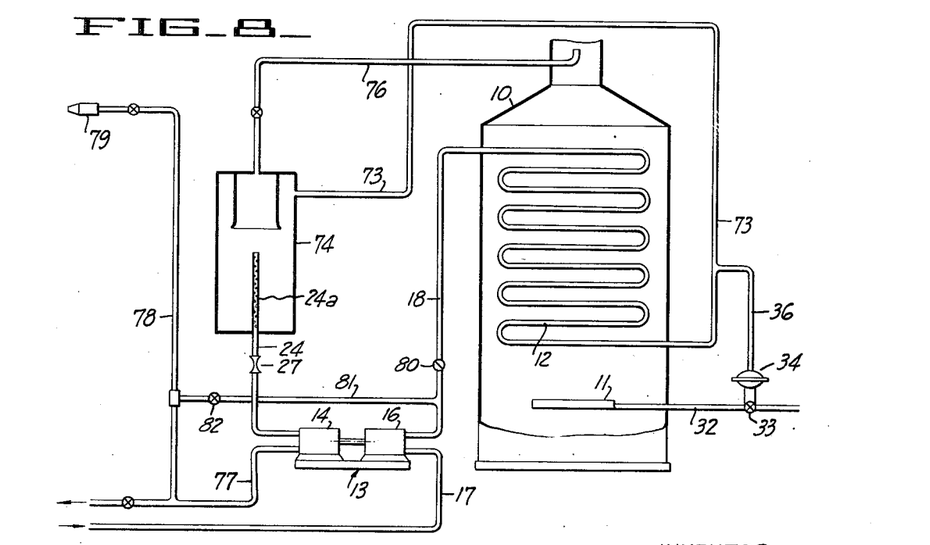
Figure 8 is a diagrammatic view illustrating an installation incorporating the present invention and particularly adapted for use in steam cleaners.

My invention can also be incorporated to advantage in apparatus where the steam is required for cleaning purposes, as for example the cleaning of exterior building walls. Thus as shown in Figure 8 the steam discharged from the boiler coil 12 is connected by line 73 to the separator chamber 74. Steam discharge line 76 from the separator may be used to advantage for discharge into the stack of the boiler, to produce a desired amount of draft. The pipe 24, the perforated portion 24a, and the orifice 27, are substantially the same as illustrated in Figure 2. The discharge line 77 from the motive device 14 may lead to a suitable tank for containing the boiler feed water. This line is shown provided with an adjustable valve or orifice to enable one to adjust the degree to which the feed water is heated. The feed water tank also connects with the line 17 leading to the pump 16. Pipe line 78 connects with line 77, and leads to the valve controlled applicator nozzle 79. A bleed line 81, controlled by valve 82, connects between the discharge line 18 from pump 16, and the line 78. Line 18 from pump 16 is provided with a check valve 80.

Operation of the arrangement shown in Figure 8 is as follows: Fluid supplied to the motive device 14 of the feed water pumping unit is controlled by orifice 27 in the same manner as previously described. In addition the rate of operation of motive device 14 is in part controlled by virtue of the fact that it is inserted in the steam flow line to the nozzle 79. In other words, as the steam consumption is increased device 14 operates at a higher rate. Normally the apparatus is adjusted whereby the steam delivered from nozzle 79 is relatively wet, as for example with a quality of the order of from 50 to 60%. This quality will be maintained substantially constant by virtue of the control means previously described, and irrespective of variations in the steam consumption. At certain times in the operation of the apparatus it is desirable to provide additional hot water to the nozzle 79. This can be accomplished by opening the valve 82, thus permitting hot water from line 18 to be discharged directly into line 78, and to be mixed with steam from line 77.

Figure 9:
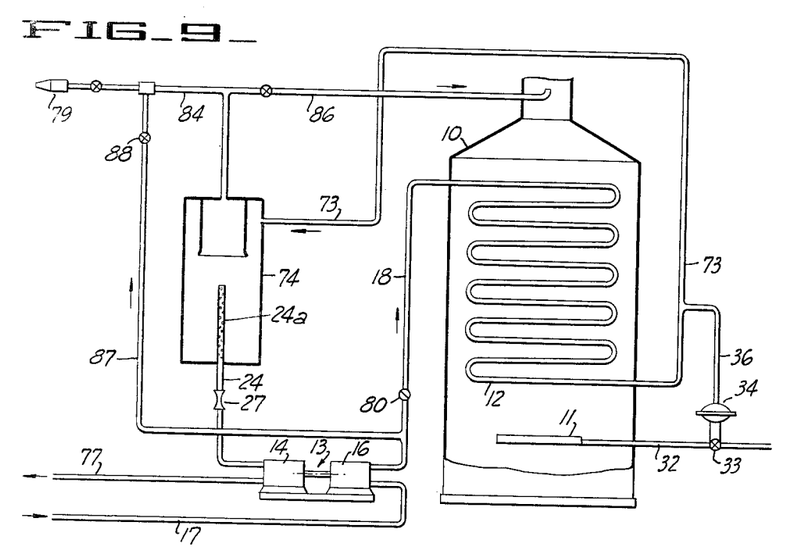
Figure 9 is a diagrammatic view somewhat similar to Figure 8, but illustrating a modification of the same.

The embodiment shown in Figure 9 is likewise suitable for cleaning purposes. In this case the pipe line 84 connects the separating chamber 74 to the applying nozzle 79. Pipe 86 may discharge into the stack of the boiler for creating a forced draft. A hot water bleed line 87, provided with control valve 88, connects between lines 18 and 84. In the arrangement of Figure 9 steam from the boiler passes through line 73 to and through the separating chamber 74 and is supplied directly to the nozzle 79. The motive device 14 is driven by fluid passing through the orifice 27 in substantially the same manner as in Figure 1. Here again the apparatus can be adjusted to supply relatively wet steam to the nozzle 79, with the quality of the steam remaining generally the same irrespective of the rate of steam consumption. More water can be added to the steam by opening the valve 88. In fact sufficient hot water can be supplied through the bleed pipe 87 so that the discharge of nozzle 79 is mainly water.

Figure 10:
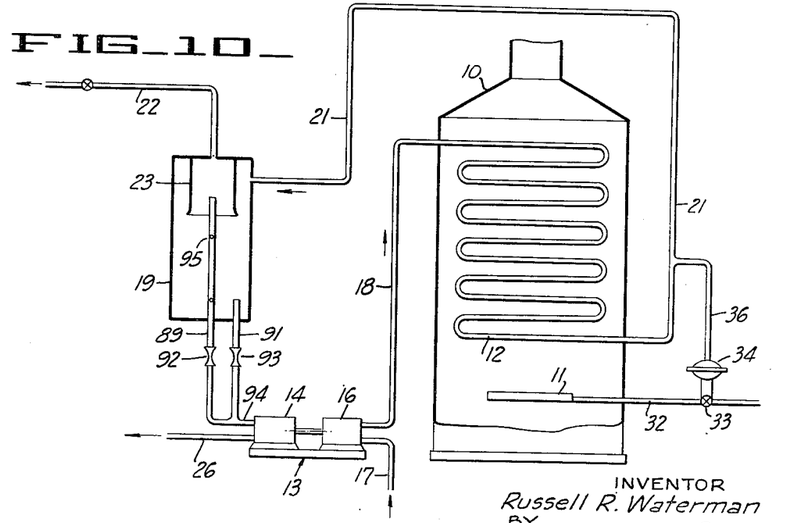
Figure 10 is a diagrammatic view similar to Figure 1, but illustrating another embodiment of the invention in which two control orifices are employed in place of one.

The characteristics of the automatic control afforded can be improved by the use of two control orifices as shown in Figure 10. Thus two pipes 89 and 91 connect with the chamber 19, and are provided with separate control orifices 92 and 93. Both lines 89 and 91, beyond the orifices 92 and 93, connect by line 94 with the motive device 14. Pipe 89 is open at its upper end within chamber 19, and is shown provided with lower perforations 95. Pipe 91 communicates with the lower portion of the chamber 19 as illustrated. Therefore the pipe 91 will be supplied with relatively wet steam or, under certain conditions hot water, depending upon the conditions of operation.

During operation of the boiler to supply steam, the orifices 92 and 93 control supply of fluid to the motive device 14 in such a manner as to tend to maintain the quality of the steam withdrawn through line 22 substantially constant. When the flow of steam through pipe 22 increases, the quality of steam supplied to both pipes 89 and 91 increases, and as a result the motive device 14 is driven at a higher rate to compensate for the increased draw-off of steam. Conversely when there is a decrease in the draw-off of steam through pipe 22, the quality of steam flowing through both pipes 89 and 91 decreases, with a proportionate greater decrease in quality for fluid passing through the pipe 91, and the controlling action of orifices 92 and 93 causes the motive device 14 to be driven at a decreased rate. When discharge of steam through pipe 22 is negligible or arrested, as during stand-by conditions, water in separator 19 will rise to such a level that the water flows through both pipes 89 and 91 to operate the device 14 at a relatively slow rate.

Figure 11:
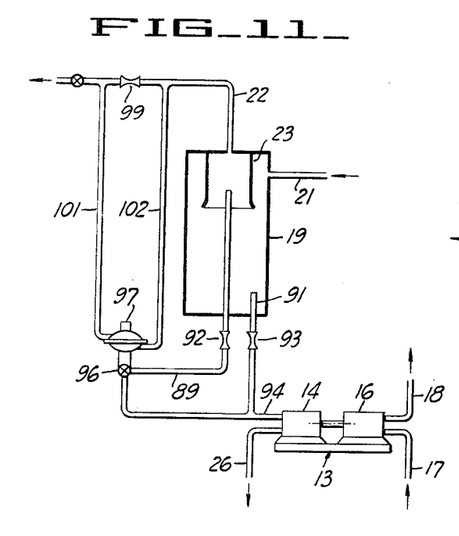
Figure 11 is a view similar to Figure 10, but illustrating an added automatic control for one of the orifices, which is operated responsive to the rate of steam consumption.

In the embodiment of the invention shown in Figure 11, operation under stand-by conditions is improved by providing means for greatly reducing or arresting flow through pipe 89, leaving only orifice 93 for supplying water to the motive device 14. Thus in this instance the valve 96 is inserted in line 89, and this valve is operated by the pressure operated diaphragm means 97. An orifice 99 is inserted in the main steam line 22, and the two sides of this orifice are connected to the fluid chambers on opposite sides of the diaphragm, by lines 101 and 102. When the flow through line 22 is relatively low or negligible, no differential pressure occurs across orifice 99, and the valve 96 is closed by its loading spring. When flow occurs through pipe 22 differential pressure is developed across orifice 99 sufficient to operate the valve 96 to open the same. In certain installations valve 96 may be arranged to be either completely closed or open depending upon whether or not there is substantial flow through line 22. In other instances it is desirable to provide a valve 96 which has a throttling action, whereby the valve increases its effective cross-sectional flow area as the flow through pipe 22 increases. In any event when flow through the main steam line 22 becomes negligible, operation of the device 14 will be solely under the control of orifice 93, and this orifice can be selected or adjusted to be of such value that under such stand-by conditions, the feed water pump 16 is driven at a desired slow rate for the desired circulatory effect. In place of the diaphragm assembly 97 for operating valve 96, I may use the device 43 of Figure 5, thus directly controlling valve 96 according to the steam consumption from line 22.

Figure 12:
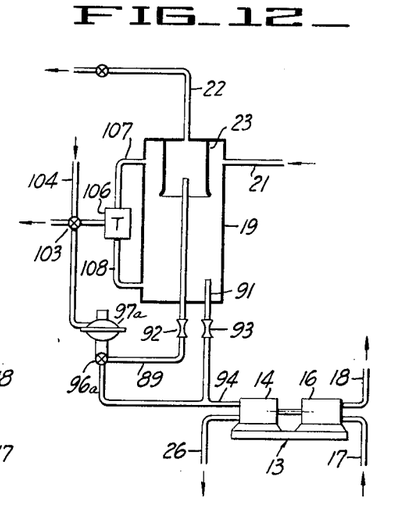
Figure 12 illustrates apparatus similar to Figure 11, but with temperature responsive means serving to control one of the orifices.

Figure 12 illustrates another embodiment of the arrangement shown in Figure 11. In this instance a control valve 103 of the supply and waste type is connected to a source of fluid pressure by line 104. The valve has a mechanical connection with the temperature responsive device 106, which in turn has pipe connections 107 and 108 to the separating chamber 19. When the draw-off of steam through pipe 22 becomes negligible, device 106 is subjected to a lower temperature, thus operating control valve 103 to relieve pressure applied to the diaphragm assembly 97a. As a result the valve 96a is closed whereby the control is solely by virtue of the orifice 93. When flow of steam through pipe 22 is resumed, the temperature of device 106 is immediately increased, and as a result the control valve 103 is turned to supply pressure to the diaphragm assembly 97a, thus opening the valve 96a.

Figure 13:
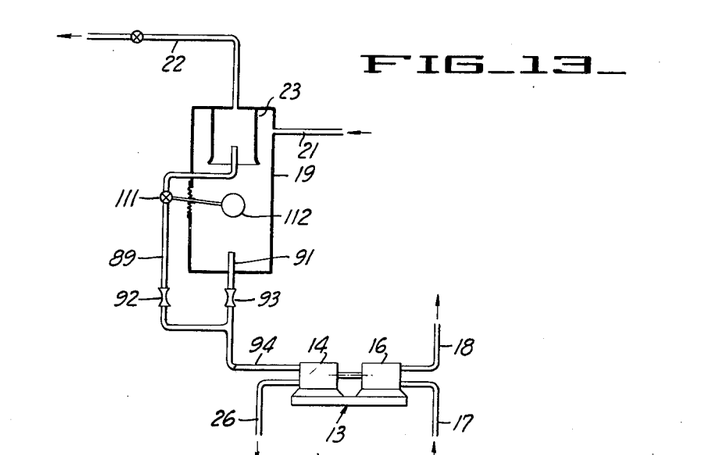
Figure 13 is a diagrammatic view similar to Figure 10, but illustrating the use of a float control for effectively adjusting one of the control orifices.

In place of the pressure control zone in Figure 11, or the temperature control as in Figure 12, a float control arrangement can be employed as shown in Figure 13. In this case the valve 111 inserted in line 89 is connected to be operated by the float 112. During times when flow of steam through pipe 22 is negligible, water accumulates in the chamber 19, thereby raising the float 112 and closing the valve 111. Thus during such intervals the motive device 14 is placed under the control of the orifice 93.

Figure 14:
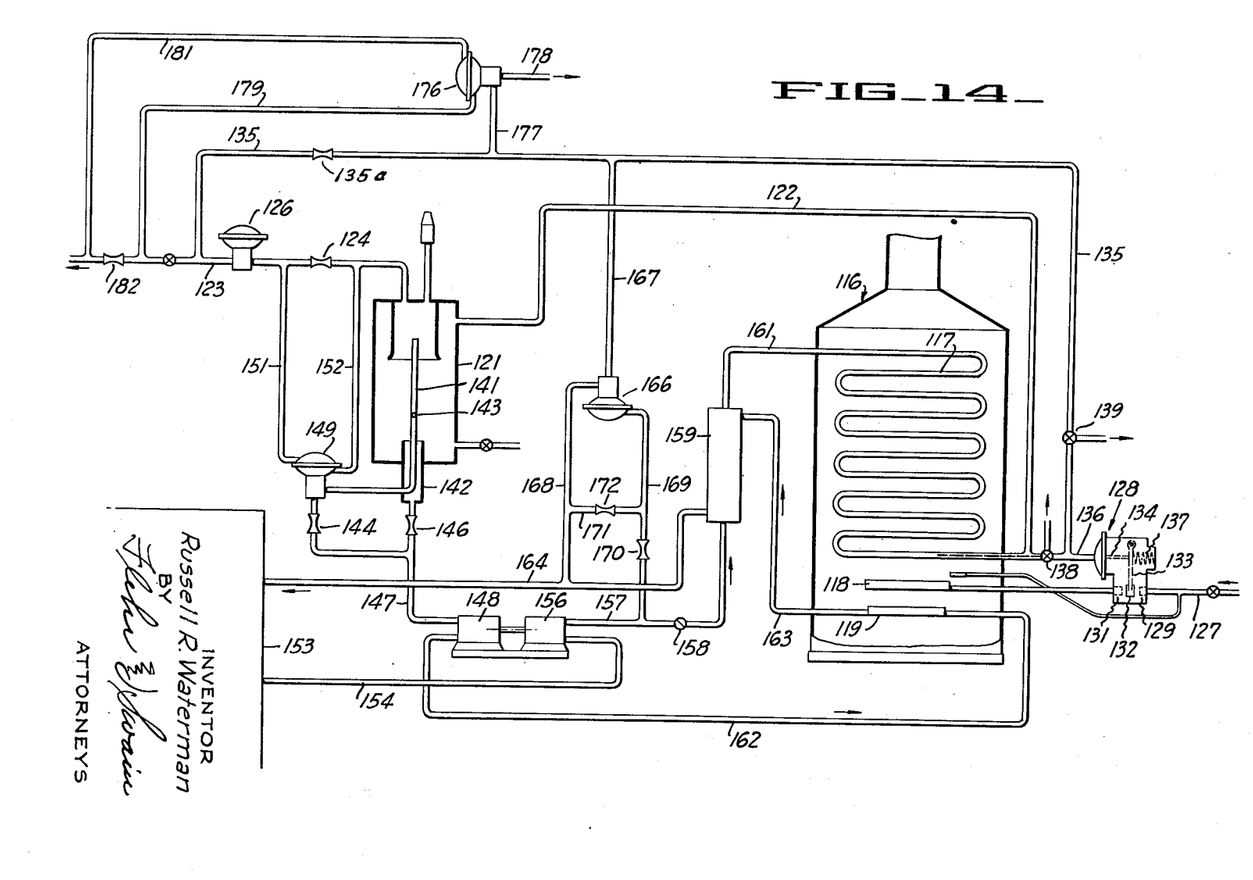
Figure 14 is a diagrammatic view illustrating a more elaborate form of apparatus incorporating the invention, and which likewise utilizes the combination of fixed and automatically adjustable orifices for controlling the feed water pump.

Figure 14 shows a more elaborate system utilizing an arrangement of two control orifices as shown in Figure 11. The arrangement in this instance includes the boiler unit 116, which is provided with the evaporating coil 117, the burner 118, and the air heater 119. The separating chamber 121 corresponding to the chamber 19 of Figure 11, has a steam line connection 122 to the steam discharge end of the coil 117. The main steam discharge line 123 leading from the separator 121, is provided with a flow restricting orifice 124, and a back pressure regulator 126, which serves to maintain a minimum boiler pressure. The fuel supply line 127 to the burner 118 includes a flow controlling device 128, the working parts of which are illustrated diagrammatically. Briefly the working parts include the valve seats 129 and 131 which are oppositely faced, and between which is the movable valve member 132. The movable valve member is carried by one end of the rocker arm 133, which in turn is connected to the operating member 134. Member 134 is connected to a fluid pressure operated diaphragm (not shown), and the closed chamber on one side of the diaphragm has a pipe connection 136 to a line 135 which extends to the outlet side of regulator 126, and which has a flow restricting orifice 135a. A loading spring 137 serves to normally urge the baffle arm 133 in a direction to close against the seat 131. During normal operation of the boiler sufficient pressure is applied to the diaphragm through connection 136 to retain the member 132 in an intermediate position with respect to both seats 129 and 131. In the event, however, the pressure should become excessive, member 132 closes upon seat 129, thus interrupting the supply of fuel. Likewise if there should be a failure of pressure, due for example to a breakage of coil 117, then member 132 closes upon seat 131, again interrupting flow of fuel to the burner. Attached to the connection 136 there is a valve 138, which when opened is adapted to vent to the atmosphere. This valve is thermostatically operated, and is adjusted whereby when the temperature of the steam exceeds a given value for which it is set, particularly a value in excess of normal temperature, then the valve is automatically opened to vent steam from the connection 136.

It is desirable to provide a small hand operated vent valve 139, connected to the pipe line 135. By opening this vent valve one may in an emergency drop the pressure of steam applied through connection 136, thus causing a shut-off of fuel to the burner.

The separator 121 is provided with two pipes 141 and 142 communicating with the interior of the same, and corresponding generally to the pipes 89 and 91 of Figure 11. Pipe 141 has an upper open end, and one or more small lower openings 143. Exterior of the separating chamber the two pipes 141 and 142 are provided with controlling orifices 144 and 146, and the pipes merge and are connected by the single pipe 147 with the motive device 148. A differential pressure flow controller 149 is also inserted in the pipe line 141, and the chambers on opposite sides of its operating diaphragm are connected by the lines 151 and 152 to the main steam line 123, on opposite sides of the orifice 124. Normally the valve formed by the flow controller 149 is closed when no differential pressure is being applied to its operating diaphragm. However, when a differential pressure is being applied, due to the drop in pressure across orifice 124, the flow controlling member of device 149 is moved to partial or complete open position.

In the arrangement of Figure 14 the feed water is stored within the tank 153, and pipe line 154 delivers water from this tank to the inlet of the pump 156. The discharge line 157 leading from the pump 156 is provided with the check valve 158, and connects with the heat exchanger 159. Line 161 connects to the hot water discharge outlet from the heat exchanger 159, and leads to the water inlet end of the boiler coil 117. The exhaust line 152 from the motive device 148 leads to the heater 119, which as previously mentioned, serves to heat air passing upwardly to the burner 118. Line 163 leads from the outlet of the heater 119, and connects with the heat exchanger 159. Liquid supplied to the heater through line 163 is withdrawn through line 164, and is delivered back into the tank 153. Heat exchanger 159 can be of any conventional type, as for example one utilizing heat transfer tubes, whereby considerable heat contained in the liquid supplied through line 163 is transferred to feed water being supplied to the boiler coil. An additional pressure operated controlling device 166 is connected to line 167 leading to the line 135. Another line 168 connects device 166 to the line 164. The chamber on one side of the operating diaphragm for device 166 is connected by line 169 to the pipe line 157, leading from the water pump 156, and line 169 is provided with a flow control orifice 170. An additional by-pass line 171 connects between pipes 168 and 169, and is provided with a flow restricting orifice 172.

Device 166 serves as a water failure safety unit. The valve incorporated in device 166 is normally open to permit communication between pipes 167 and 168, when no water pressure is being applied through pipe 157 by the pump 156. However, when the pump 156 is in operation and is applying an outlet pressure, such pressure applied through line 169 and orifice 170 to the diaphragm of device 166, maintains the valve of device 166 closed, to interrupt communication between pipes 167 and 168. When the valve incorporated in device 166 is opened, steam from line 135 is free to flow through the same to the line 164. Thus the pressure in line 135 will be dropped to a sufficiently low value to cause member 132 of device 128 to close upon seat 131 and to thus interrupt flow of fuel to the burner 118.

In addition to the foregoing it is desirable to provide a safety unit which will cause interruption of fuel to the burner when flow of stream through the main line 123 is interrupted. For this purpose I provide a flow controlling device 176, having a connection 177 to the line 135, and an atmospheric vent connection 178. Chambers on opposite sides of the operating diaphragm for device 176 are connected across the flow restricting orifice 182. The arrangement is such that as long as there is a substantial pressure differential across orifice 182, due to flow of steam, device 176 remains closed whereby no steam flows through pipe connection 177. However, when flow of steam through line 123 is interrupted there is no longer a pressure differential across orifice 182, and therefore the valve incorporated in device 176 is opened to permit free venting of steam through pipe 177 to the atmosphere. This likewise reduces the pressure in line 135, thereby operating device 128 to interrupt the supply of fuel.

This application is a continuation-in-part of the subject matter disclosed in my co-pending application Serial No. 564,313, filed November 20, 1944, now abandoned.

I claim:

1. Apparatus for controlling the supply of feed water to a coil type flash boiler, in which the feed water is being delivered into one end of the coil by a feed water pumping unit consisting of a steam driven motor device having a driving connection with the feed water pump, and in which a source of heat is in thermal conductive relation to the coil, a steam separating chamber having a connection to the steam delivery outlet end of the boiler coil and a steam outlet connection from its upper portion to a steam supply pipe whereby steam from the boiler unit flowing to a point of demand passes through said separating chamber, said separating chamber being thermally isolated from said source of heat and providing upper steam and a lower water space therein, a flow connecting means forming a fluid flow connection from the interior of the separating chamber to said motor device, said means comprising two pipes each providing a point of communication with the interior of the chamber, the point of connection being at different levels within the same, the higher point of communication being within said steam space to sample the steam therein as to quality and the lower point of communication being in the water space, and flow restricting means comprising two flow restricting orifices, one interposed in each of said pipes and serving to vary the rate of supply of fluid from the chamber to said motor device in terms of volume per unit of time, responsive to variations in the water to vapor ratio flowing to said motor device.

2. Apparatus as in claim 1 together with a flow control valve imposed in the pipe which connects with the upper one of said two points of connection and means for automatically controlling said valve to close the same responsive to discontinuance of steam flow through the steam supply pipe.

References Cited in the file of this patent

UNITED STATES PATENTS

| Number | Name | Date |
|---|---|---|
| 13,567 | Densmore | Sept. 18, 1855 |
| 272,730 | Mather | Feb. 20, 1883 |
| 566,644 | Yarrow | Aug. 25, 1896 |
| 970,421 | Copley | Sept. 13, 1910 |
| 974,085 | Lindgren | Oct. 25, 1910 |
| 1,002,080 | Patterson | Aug. 29, 1911 |
| 1,212,197 | Elmer | Jan. 16, 1917 |
| 1,401,894 | Du Pont | Dec. 27, 1921 |
| 1,646,945 | Wempe | Oct. 25, 1927 |
| 1,781,749 | Davin | Nov. 18, 1930 |
| 1,828,870 | Lucke | Oct. 27, 1931 |
| 1,898,196 | Lucke | Feb. 21, 1933 |
| 2,185,803 | Diedrich | Jan. 2, 1940 |
| 2,326,559 | Proctor | Aug. 10, 1943 |
| 2,355,125 | Waterman | Aug. 8, 1944 |
| 2,405,573 | Frisch | Aug. 13, 1946 |
| 2,574,368 | Arant | Nov. 6, 1951 |